United States Patent [19]

Kawakami

[11] 3,968,594

[45] July 13, 1976

[54] METHOD AND APPARATUS FOR THE CHEMICAL TREATMENT OF TREES

[76] Inventor: George S. Kawakami, 810 1/2 E. 31st St., Kansas City, Mo. 64109

[22] Filed: Aug. 11, 1975

[21] Appl. No.: 603,476

Related U.S. Application Data

[63] Continuation of Ser. No. 461,012, Aug. 15, 1974, abandoned.

[52] U.S. Cl. .............................................. 47/57.5
[51] Int. Cl.² ...................................... A01G 29/00
[58] Field of Search .............. 47/57.5; 175/17, 394; 111/6

[56] References Cited
UNITED STATES PATENTS

| | | | |
|---|---|---|---|
| 2,044,063 | 6/1936 | Dahlberg | 47/57.5 |
| 3,295,254 | 1/1967 | Schoonman | 47/57.5 |
| 3,834,075 | 9/1974 | Nix et al. | 47/57.5 |

Primary Examiner—Robert E. Bagwill
Attorney, Agent, or Firm—Lowe, Kokjer, Kircher

[57] ABSTRACT

A self-tapping applicator head for chemical injection treatment of trees comprises a socket and a tapered integrally formed and exteriorly threaded shank portion. A centrally-defined hole or passageway extends substantially the length of the shank portion, connecting the tip of the shank with the socket. The tip portion of the shank has a plurality of output orifices defined therein and oriented transversely in communicating relationship with respect to the central passageway. The socket is provided with a centrally defined interiorly threaded hole, which has a diameter substantially greater than the diameter of the shank passageway, and which matingly receives the male fitting at one end of a separate, pressurized hose line. Pressurized chemicals delivered to the socket fitting are forced through the nozzle shank output orifices into the sapwood portion of the tree with the sealing effect of the tapered nozzle preventing leakage therearound. The method comprises the steps of drilling a hole in the trunk of the tree to be treated, inserting the aforementioned applicator by threaded rotation of same until the shank tip penetrates the tree sap line, and applying chemicals under pressure via a line connection to the nozzle head.

1 Claim, 5 Drawing Figures

METHOD AND APPARATUS FOR THE CHEMICAL TREATMENT OF TREES

This is a continuation of abandoned application Ser. No. 461,012, filed Apr. 15, 1974.

BACKGROUND AND BRIEF SUMMARY OF THE INVENTION

This invention relates to an apparatus for the treatment of tree diseases by chemical injection. More particularly this invention relates to an improved chemical applicator nozzle and a method of employing same.

Most tree diseases are caused by living organisms or pathogens, and it has been found that many of these can be combatted by applying appropriate chemicals to affected areas of the tree. In the treatment of Dutch elm disease, for example, it has been found advantageous to inject the chemical into the sapwood portion of the elm tree trunk.

In order to treat a tree by the chemical injection method, a hole is first drilled in the tree trunk and an applicator head is inserted therein. Pressurized chemicals are then injected into the tree via an appropriate pipe fitting or connection between the applicator head and the pressure line.

A typical prior art treatment head or applicator comprised a tubular shank portion having a threaded tip structure of a slightly larger diameter for positive engagement with the tree, and a socket attached thereto for insertion of the nozzle. Additionally, a sealing ring is sometimes included. Output orifices provided at predetermined locations in the nozzle shank portion would emit the desired chemicals in response to the application of same to a threaded aperture in the socket head which communicated therewith.

Successful installation of the aforementioned prior art nozzle necessitated the drilling of a first hole into the sapwood of the tree. The diameter of this hole would be slightly smaller than the outer diameter of the threaded nozzle tip. A second hole or counterbore having a diameter substantially equal to the nozzle head or sealing ring (if provided) would then be added to insure that when the output orifices in the nozzle shank reached the sapwood, the nozzle would be sealed. The counterbore facilitated sealing by enabling a sealing ring of the inwardly directed nozzle head surface portion to firmly seat against the wood. Following the drilling operation, the hole would be cleaned out in order to insure that the nozzle output orifices could reach the sapwood and that the nozzle head would be adequately sealed without interference from loose wood particles. In many instances, it was necessary to hammer the treatment head into the hole to insure a proper fit for the pressurized injection process thereby often damaging the treatment head, as well as being a time consuming task.

It is a fundamental object of the subject invention to provide an applicator nozzle for the injection treatment of trees which may be quickly and reliably utilized without the aforementioned installation complexities. Accordingly, the subject nozzle comprises a socket and an integral tapered shank portion having output orifices at its tip. The taper of the shank, together with exterior threads provided thereon, facilitate self tapping and self sealing of the nozzle. Furthermore, no hole cleaning operation is necessary, as the threads of the nozzle shank, rather than the inwardly directed surface of the nozzle head or separate sealing ring, provides sealing. The necessity of a second drilling operation (counterbore) and hammering step has thus been avoided.

It is a further object of this invention to provide a highly efficient and simplified method for the injection treatment of trees. In operation, a single hole is drilled and the aforementioned nozzle is inserted therein. The nozzle is threadably rotated until the output orifices at the shank portion tip have advanced to the sapwood area of the tree. Pressurized chemicals, applied via a threaded aperture in the nozzle head, are dispersed within the sapwood through the output orifices. A leakproof seal is formed between the shank threads and the wood in response to threaded advancement of the nozzle because of the taper of the shank. The prior art steps of counterboring and cleaning the nozzle insertion hole have thus been avoided. Furthermore, the penetration of the sapwood area by the nozzle shank has been reduced to a simple step.

It is another object of this invention to provide an integrally constructed applicator of extreme strength which is highly resistant to breakage. Prior art nozzles are often welded together from combinations of smaller parts. Often the smaller shank portion breaks in response to shear or stress. In the subject invention however, the shank portion is integral with the socket, and the device may be machined from a single casting or section of metal stock. Since the shank is tapered, its strength is greater than prior art nozzles having a uniform but smaller shank diameter. Furthermore, since the output orifices are located in the shank tip, a region not ordinarily subjected to stress, their presence does not significantly weaken the shank.

Another object of this invention is to provide an applicator treatment head which will threadably engage the outer wood areas of the tree into which the nozzle is inserted for added strength. The tapered threaded shank of the subject nozzle facilitates this, unlike prior art devices which theadably engage the weaker sapwood via the threaded tip portion of the nozzle shank. Accordingly, less likelihood of "stripping" is realized from the disclosed construction, and a firmer connection results.

It is yet another object of this invention to provide a method of chemically injecting trees and apparatus for use therewith that will minimize the damage incurred by the treated tree as well as to the treatment head itself. As previously mentioned, only one hole need be drilled, as the necessity for counterboring has been avoided. Since sealing is facilitated by the tapered shank threads, rather than a larger diameter socket head or sealing ring, adverse effect on bark, woodpulp, and applicator are minimized along with the time required for a normal installation. Further, there is no longer any need to pound or hammer the head into place. All factors considered, the unique applicator and method have significantly reduced the time for treating diseased trees.

Other and further objects of the invention, together with the features of novelty appurtenant thereto, will appear in the course of the following description.

DESCRIPTION OF THE DRAWINGS

In the accompanying drawings, which form a part of the specification and are to be read in conjunction therewith, and in which like reference numerals are employed to indicate like parts in the various views;

With reference to FIG. 1, there is seen a typical prior art applicator nozzle 10 comprising a head 14, a tubular shank portion 11, and a threaded shank tip portion 18. Head 14 in turn comprises a drive socket 12 which is concentrically welded to a sealing ring 13 and with shank 11 being concentrically welded to ring 13. A threaded aperture (not shown) is located in socket 12 and communicates with ejection holes 15 in shank 11 so that chemicals may be delivered therethrough.

Figure 5:
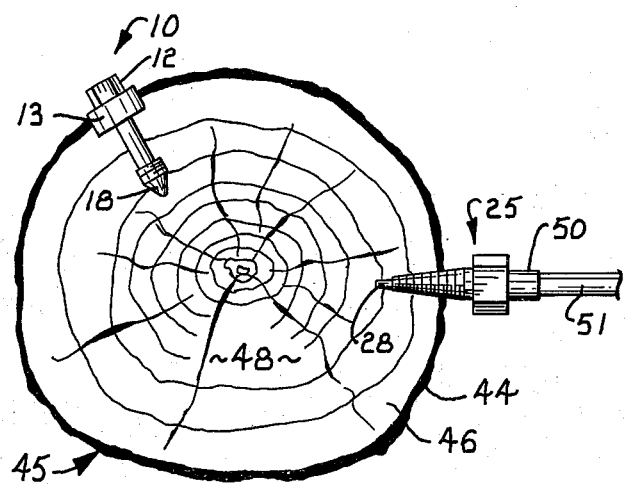
FIG. 5 is a cross sectional plan view of a tree trunk with the tapered shank applicator nozzle and a prior art nozzle installed.

Nozzle 10 must be installed so that ejector holes 15 reach the sapwood area of the tree (FIG. 5). To accomplish this a first hole, having a diameter substantially equal to the diameter of conical, threaded shank tip 18, is drilled. A second hole or counterbore must then be provided so that a raised annular lip 20, located on the inner surface 21 of head sealing ring structure 13, will securely contact the wood to provide sealing. The diameter of the second hole must be substantially equal to the diameter of sealing ring 13.

After the drilling operation, the hole must be cleaned so that loose wood shavings do not block output orifices 15 or interfere with sealing ring 13. The nozzle is then twisted (or hammered) into the hole by rotating the nozzle via socket 12, causing threads 16 on tip 18 to engage the sapwood and pull the nozzle into the hole until ring 13 firmly contacts the counterbore surface. If ejector holes 15 are not located in the sapwood area when ring 13 seats, or if the sapwood engaged by threads 16 "strips," either the hole must be adjusted or a new one must be drilled.

Figure 2:
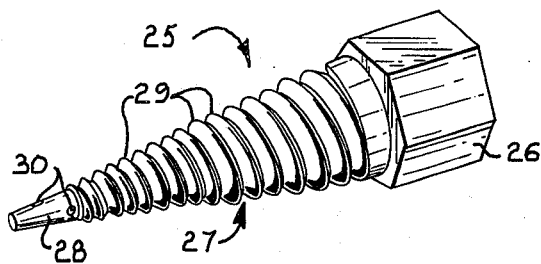
FIG. 2 is a perspective view of a tapered shank injector applicator nozzle constructed in accordance with the principles of this invention.

In FIG. 2 an integrally constructed injection applicator nozzle 25 comprises a drive socket 26 and a tapered and externally threaded shank portion 27, which terminates in an outwardly smooth tip portion 28. Threads 29 on tapered shank 27 enable the nozzle to penetratingly engage a pre-drilled hole in the tree trunk in response to rotation of the nozzle via socket 26 with conventional tools.

Figure 3:
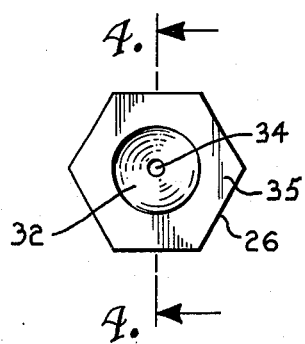
FIG. 3 is an end view of the tapered shank applicator nozzle socket head.

As seen in FIG. 3, an inlet 32 is concentrically drilled in the end 35 of socket 26. Inlet 32 is provided with interior threads 36 (FIG. 4) so that a separate pressure line connector 50 (FIG. 5) may be matingly received. Passageway 34 (FIGS. 3 and 4) extends interiorly of shank 27 between input orifice 32 and the nozzle output orifices 30 in shank tip 28. Tip 28 is blocked at its extreme end portion 40 so that chemicals entering the nozzle may escape only through the transversely oriented nozzle output orifices 30.

A method of treating a tree by chemical injection with the aforementioned nozzle is best described in conjunction with FIG. 5. An appropriate hole is first drilled into tree trunk 45. This hole must extend through bark 44 and outer hardwood 46 into the sapwood region 48. Applicator nozzle 25 is then inserted into this hole and threadably advanced until tip 28 penetrates the sapwood region within the tree. A pressure line 51 is then interconnected to nozzle inlet 32 via a threaded male connector 50, and chemicals delivered thereby and forced into the sapwood region via nozzle output orifices 30.

Figure 1:
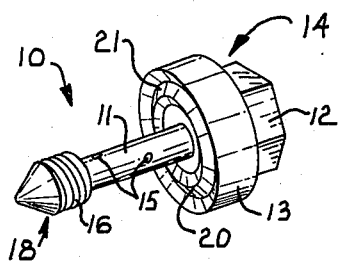
FIG. 1 is a perspective view of a typical prior art chemical injecting applicator nozzle.
Figure 4:
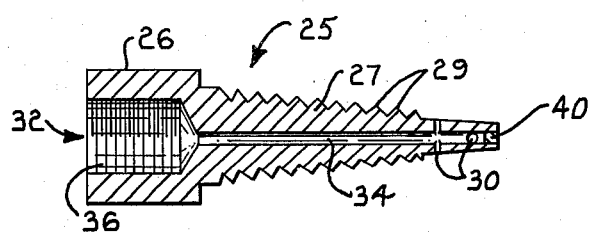
FIG. 4 is a sectional view of the tapered shank applicator nozzle taken along line 4—4 of FIG. 3.

It is important to note that when the nozzle is installed a seal is formed between the threaded shank portion 27 of the nozzle and the wood comprising area 46. Thus the need for the prior art sealing ring 13 (FIG. 1) and the associated counterbore is avoided. Furthermore, the engagement of shank threads 29 with the hardwood in region 46 provides an extremely firm "connection" to the tree, unlike the prior art nozzle 10 which threadably engages only the weaker sapwood via tip 18 (FIGS. 1 and 4).

From the foregoing, it will be seen that this invention is one well adapted to attain all of the ends and objects herein set forth, together with other advantages which are obvious and which are inherent to the structure.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A self-tapping applicator nozzle for treating trees comprising:
    a socket having an inlet orifice defined therein, a substantially straight shank portion extending from said socket in a tapered manner and having an interior passageway extending longitudinally therein, said interior passageway communicating with said socket inlet orifice, said shank portion having external threads winding continuously thereon throughout the entire length of said shank portion and arranged to permit the threadable advancement of said shank portion into a tree, said shank portion being exteriorly imperforate the entire length thereof;
    a non-threaded tip connected to the end of said shank portion remote from said socket, said interior passageway terminating within said tip; and
    a plurality of output orifices extending transversely in said tip from said interior passageway to the exterior of said tip, all of said orifices being located in said tip and beyond the threads of said shank portion.

* * * * *